J. SCHIESSLER.
TELEGRAPHY AND TELEPHONY BY SUBMARINE CABLES, LONG DISTANCE OVERHEAD LINES, AND THE LIKE.
APPLICATION FILED FEB. 7, 1912.

1,178,878.

Patented Apr. 11, 1916.

3 SHEETS—SHEET 1.

Witnesses:

Inventor
Josef Schiessler

J. SCHIESSLER.
TELEGRAPHY AND TELEPHONY BY SUBMARINE CABLES, LONG DISTANCE OVERHEAD LINES, AND THE LIKE.
APPLICATION FILED FEB. 7, 1912.
1,178,878.
Patented Apr. 11, 1916.
3 SHEETS—SHEET 2.
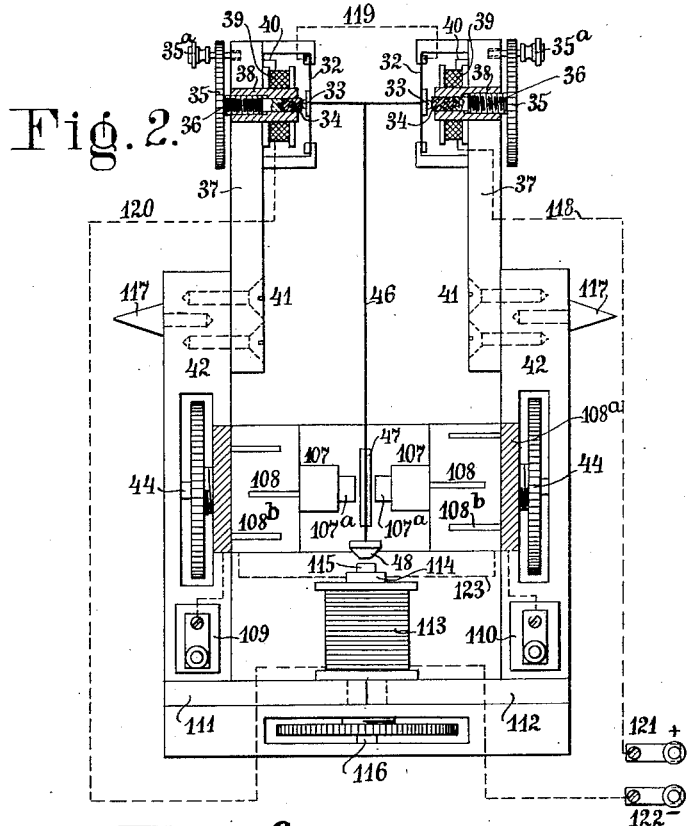
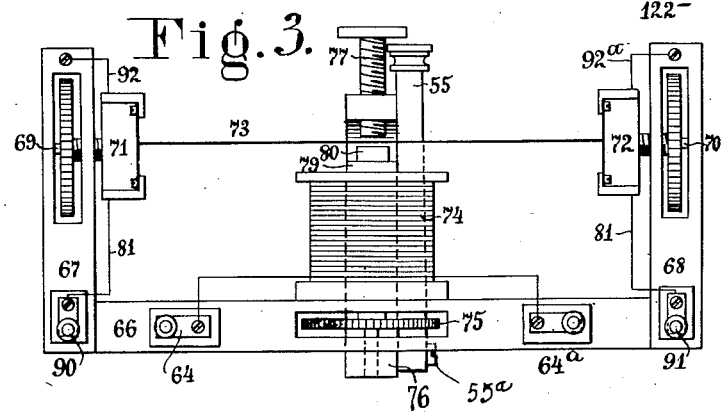
Witnesses:
B. V. Dommers
M. J. L. Higgins
Inventor.
Josef Schiessler
By Henry Orth Jr.
Atty

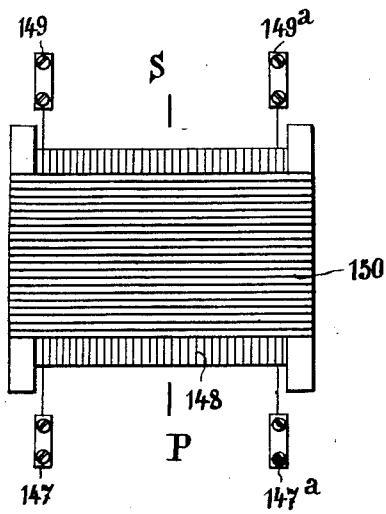
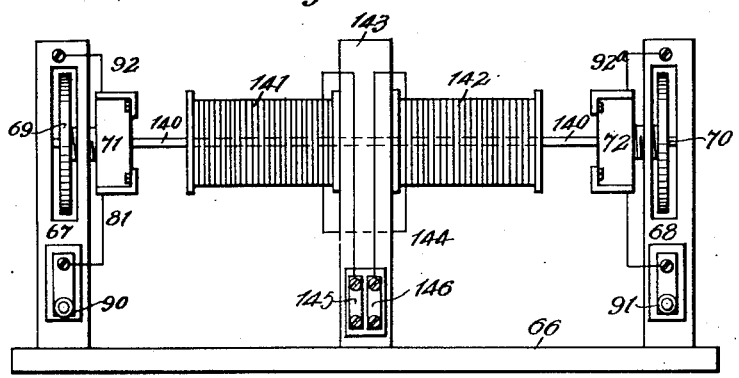
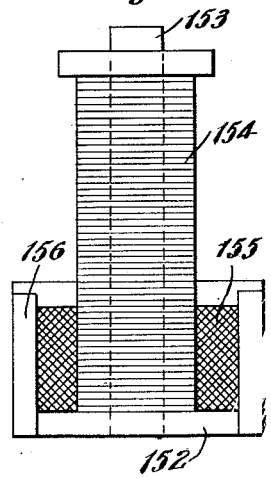

UNITED STATES PATENT OFFICE.

JOSEF SCHIESSLER, OF BADEN, NEAR VIENNA, AUSTRIA-HUNGARY.

TELEGRAPHY AND TELEPHONY BY SUBMARINE CABLES, LONG-DISTANCE OVERHEAD LINES, AND THE LIKE.

1,178,878.

Specification of Letters Patent.

Patented Apr. 11, 1916.

Application filed February 7, 1912. Serial No. 675,990.

*To all whom it may concern:*

Be it known that I, JOSEF SCHIESSLER, subject of the Emperor of Austria-Hungary, residing at Baden, near Vienna, Austria-Hungary, have invented certain new and useful Improvements in Telegraphy and Telephony by Submarine Cables, Long-Distance Overhead Lines, and the like, of which the following is a specification.

This invention relates to apparatus for electric telegraphy and telephony, and has for its object to provide new and improved receiving apparatus especially suitable for use on long distance lines, cables and the like.

The principle on which apparatus according to this invention is based consists in maintaining an oscillatory member in forced equlibrium by means of a number of forces, some or all of which are magnetic forces and which act on the said member simultaneously, the said equilibrium being disturbed by means of the line currents acting on one of the magnetic forces and alternately strengthening and weakening its intensity.

The invention is illustrated in the accompanying drawings, in which like parts are similarly designated.

Figure 1:
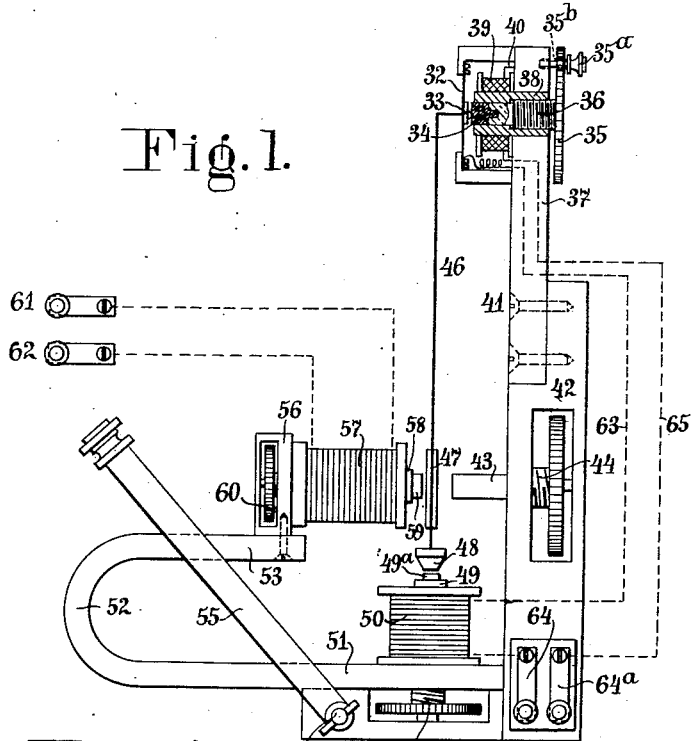

Figure 1 shows an apparatus for receiving telegraphic or telephonic messages. Figs. 2 to 5 illustrate modifications thereof. Fig. 6 is a transformer coil used in this system, and Fig. 7 is a cross section through a magnet of fixation preferably used in connection with the arrangements illustrated in Figs. 1 to 5.

Referring to the drawings—Figs. 1 to 5 show several modifications of an apparatus for receiving and at the same time reinforcing telephonic messages. The constructional form of the apparatus shown in Fig. 1 comprises a permanent horse shoe magnet 52 having two legs of unequal length, on the longer leg 51 of which is mounted a hollow, soft iron core 49, which carries the coil 50. In this hollow core 49 is inserted a second core 49$^a$, which can be adjusted in its position relative to the first by means of a screw with a milled head 54. An iron rod 55 is slidable on both legs of the horse shoe magnet, and is pivotally connected with it at 55$^a$, to regulate the polarization; that is to say, the amount of magnetic force available in the poles of the horse shoe magnet, and therefore in the soft iron cores 49 and 49$^a$. On the other leg of the horse shoe magnet is mounted a soft iron plate 56, carrying a hollow soft iron core 58 and a second soft iron core 59 slidable within said hollow core. The second soft iron core can be adjusted by the screw 60 which has a milled head. The iron core 58 is provided with a coil of thin wire 57, which leads to the terminals 61 and 62 where the line currents are applied. In front of the soft iron core 58 is positioned an armature 47 which is carried by the longer arm of a bell-crank lever 46 the shorter arm of which is fastened to the diaphragm of a microphone. At the end of the longer arm of said bell crank lever is a second soft iron armature 48, situated opposite the end of the core 49$^a$, which may be of any suitable shape, but preferably has a cylindrical body formed with a cone at its outer end. The diaphragm 32 on which the bell crank lever 46 is fastened, may be made of any resilient material, and at its inner face carries a central iron disk (unless it is made as a whole of an iron plate). It is provided with a contact 33 which coöperates with an adjustable contact 34 preferably made of carbon and mounted on a little brass screw 36, which may be adjusted by means of its milled head 35. The position of this head is maintained by means of the setscrew 35$^a$, which can enter any one of a series of holes 35$^b$ provided in the head 35, and is fastened in the bar magnet 37 that carries the whole microphone structure. The brass screw 36 is movable in a soft iron core 38 mounted on the pole of this magnet and carries the microphone coil 39. The bar magnet is fastened with screws 41 or otherwise on an upright 42 of brass on which also the aforementioned horse shoe magnet 52 with its structure is mounted. Opposite the core 59 and the armature 47 of the bell crank lever is a permanent magnet 43, adjustably mounted on the upright, the adjustment being performed by means of the screw 44. The terminals 64 and 64$^a$ are connected with a local source of current. This circuit may be traced from terminal 64 over coil 50, wire 63, diaphragm 32, contact 33, carbon contact 34, hollow iron core 38 and magnet iron 37, through a short connection piece 40 to the microphone coil 39, and by means of wire 65 back to terminal 64ª and to battery.

The apparatus shown, which has been described as a receiver, may, with only slight changes be used as a transmitter. Then instead of the soft iron core 59 with headed screw 60, a mouth piece may be inserted for conducting the sound waves to the armature plate 47, which therefore, together with the bell crank lever 46 will oscillate rythmically in accordance to the sound oscillations. An apparatus of this kind has been found to be very sensitive, and of course is also sensitive to oscillations coming from outside; therefore it must be rendered sound insulated by placing it on cork or India rubber.

A very good insulation against oscillations from without is a so-called Cardan suspension. Fig. 2 shows an apparatus of this kind, which at the same time is slightly modified with respect to Fig. 1, and is constructed symmetrically with respect to its middle axis, and is capable of being suspended on two pivots 117, made of chilled and polished steel.

As can be seen from the drawing, the two microphones are identical to that of Fig. 1; only instead of a bell-crank lever, a T-shaped lever 46 is used, attached to both diaphragms of both microphones with its horizontal arm. The magnet 113 for fixation of the lever is also identical to that of Fig. 1, but in this case is not mounted on the horse shoe magnet, but, for better symmetry, on two adjacent bar magnets 111 and 112 having their similar poles directed toward each other, and which surround the hollow soft iron core 114. The armature 47 is acted upon by two magnets 108, provided with a hollow soft iron core 107, in which a second slidable core 107ª is introduced, this second core being adjustable by means of a screw 44. These cores can be magnetized by the inductive action of a permanent magnet, as in Fig. 1, or, as shown in Fig. 2, the polarization may only be effected temporarily by mantle or tubular magnets arranged in the middle of a closed frame 108ª common to both magnets. The mantle of the said magnets is provided with slots 108ᵇ and the hollow cores 107 protrude for about one third of their length from these mantles. The coils of these magnets may be connected in series or in parallel. The line currents are introduced at the terminals 109 and 110, while the local current source is connected to terminals 121 and 122. The local circuit can therefore be traced from terminal 121 through the microphones in series or in parallel, through conductor 120 and magnet of fixation 113 to the other terminal 122.

In Fig. 3 another modification with two microphones is shown, in which a steel spring or wire 73 with a central plate, disk or the like, is used. The steel spring is attached to the diaphragms of the microphones, each of which can be adjusted in the uprights 67 and 68, respectively, in its position by means of a screw with a milled head, 69 and 70, respectively, so as to regulate the tension of the steel spring 73. Beneath this steel spring is arranged the line coil 74 on a cross piece 66, the hollow soft iron core of which is mounted on one leg of a permanent horse shoe magnet 76. Within the hollow core 79 of the coil 74 is a second core 80, adjustable by means of a screw 75. The horse shoe magnet 76 is shown in Fig. 3 with its poles turned toward the observer. The other leg of this magnet carries a soft iron screw 77 magnetized by influence from the horse shoe magnet 76, and this screw 77 is provided as a damping magnet for the oscillations of the steel spring. The horse shoe magnet is provided with an iron rod 55, pivotally connected at 55ª with one of its legs, to regulate the intensity of its magnetic field, as has been explained with reference to Fig. 1. The line currents are applied to the terminals 64 and 64ª, and from these flow through the coil 74. The local circuit can be traced from terminal 90 over conductor 81 to the microphone, and over conductor 92 through upright 67, cross piece 66, upright 68, or a special conductor, to the conductor 92ª and the microphone, and back to the terminal 91.

Figure 4:
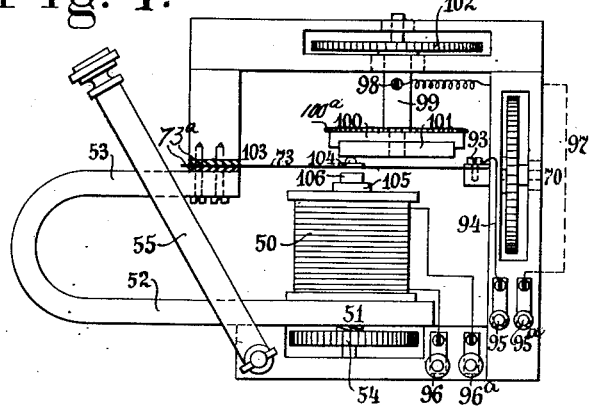

Fig. 4 shows another modification of the arrangement, in which the steel spring 73 carries the microphone contact. For this purpose it carries a contact plate 104, furnished with a contact, while the other contact is formed by the carbon plate 101 mounted in a brass frame 100, which is frictionally mounted on the spindle 99, so that it can be turned with a certain amount of force. The spindle 99 is adjustable by means of a screw 102. As shown in Fig. 4 the contact 104 is arranged eccentrically with respect to the carbon contact disk 101, which can be turned up by means of the milled head 100ª on the frame 100. The steel spring 73 is mounted on the magnet 53 by means of insulating fiber plates 73ª, while it is fastened at its other end at 93 to an adjustable screw-spindle. By this means its tension can be regulated. The line currents which enter at the terminals 96, 96ª pass through the line magnet 50, whereby a variable attraction is exerted on the steel spring. The local current enters at terminal 95 and passes over wire 94 and screw 93 to the steel spring 73; from contact 104 on the steel spring to the carbon contact 101, thus forming a transitional resistance between the two contacts; from the second contact 101 the current flows through the brass spindle 99, binding post 98, wire 97, which may be substituted by a German silver spring, to the second terminal 95ª.

Fig. 5 shows a modification of the arrangement of Fig. 3; with this arrangement the iron rod 140 between the diaphragms of the microphones 71 and 72 is fixed in the upright 143 about its middle part. The two coils 141 and 142 are arranged co-axially to this rod so as to magnetize said rod lengthwise, which causes rythmical longitudinal oscillations of the rod. These oscillations of the rod cause the diaphragms of the microphones 71 and 72 to oscillate therewith in accordance to the longitudinal oscillations of the rod. The line currents entering at 145 go through the coils 141 and 142 in series, and back to terminal 146. The local circuit can be traced from terminal 90 through conductor 81 to the microphone 71, conductor 92, upright 67, cross piece 66, upright 68, conductor 92ª, microphone 72, back to terminal 91.

In all the arrangements described, the parts of which are, of course, interchangeable at will, combinations between the modifications described and the parts thereof are possible.

Special care must be paid to the contacts which form the transitional resistances. They may be of metallic or non-metallic substances. For example, one of the contacts may be of rectifying material, as pyrites, blendes or glances, while the other contact is made of some alloy, such as delta metal, a manganese copper iron zinc alloy, Muntz's or yellow metal, both copper zinc alloys, or the like, or of some platinum alloy. On one side also hygroscopic mixtures may be used as contacts, as, for instance, a paste of graphite, silundum, a carborundum compound, selenium or the like, with litharge, chlorids of magnesium or the like. Very good contacts are also obtained by chilled and polished steel balls, such as are used in bicycle bearings, which have been pressed in, the other contact then being of hard carbon, of a good conductivity, held in a brass frame. Such contacts are extremely sensitive, as has been proved by experience.

The transformer coils used throughout the apparatus described, are shown in Fig. 6. The coil is flat, and the primary winding 148 is supplied with current at the terminals 147, 147ª. The secondary winding lies beneath the primary winding and is connected with the terminals 149 and 149ª. The coil is further provided with an iron core, subdivided not only lengthwise but also in the transverse direction, the elements thus formed being magnetically insulated from each other; thus owing to the transverse subdivision the primary winding is laid over numerous joints. The coil is then provided with an insulated iron wire, preferably an enameled wire, wound all over the coil, which may be grounded when wound in the same direction as the other windings to annihilate the eddy currents. When the iron wire is wound lengthwise over the coil, no eddy currents at all will occur, because of crossing wires.

In Fig. 7 is shown a form of execution of a magnet of fixation which may be used in connection with any one of the arrangements described, when a very powerful action is required. The magnet shown is arranged for a current of high voltage, and may be used connected to any power line or lighting main. If such is not obtainable the magnetic force is increased by constructing a magnetic magazine consisting of a series of magnetic tubes concentrically fitting one into the other, and being of different lengths. In the former case a coil 154 of comparatively small diameter is arranged on a soft iron plate 152, which forms the base of the magnet. This coil is provided with an iron core 153. The electro-magnet thus formed and excited by the currents of the power line, forms the core of a second magnet, which consists of a coil 155 of greater diameter wound over the first, the height of this coil 155 being only about one-third that of the coil 154. Over this large coil is placed a mantle of iron, 156. Thus a very powerful action of the magnets may be obtained.

The operation of the apparatus described is as follows: The apparatus (Figs. 1 to 5) is first adjusted to resonance with the frequency of the oscillations to be received. This adjustment is performed by means of the adjustable soft iron cores. The bell crank lever 46 (Fig. 1) carrying the armatures, acts under the influence of three orthogonal magnetic forces, and thereby obtains a resultant position of equilibrium, which position may be varied at will by means of adjustment of the iron cores. The magnetic polarization, that is to say, the amount of magnetic force acting on the lever 46 is then regulated by means of the iron rod 55. This adjustment is made previously to the incoming of oscillations. If now, these oscillations, transformed into undulatory currents, pass through coil 57, they act upon the iron cores 58 and 59 magnetized by influence from the permanent magnet and alternately weaken and strengthen their magnetic force. Thus the equilibrium is disturbed and the steel spring 46 is set into vibrations which correspond to the oscillations of the line current. These vibrations are imparted to the diaphragm 32, and even multiplied in accordance to the ratio of the length of the lever arms, and thus strengthened undulations are obtained in the local circuit. These undulations alter the polarization of the iron core 38 and thereby the attractive force is exercised on the diaphragm, which in its turn reacts on the transitional resistance 33—34 and on the current, thus strengthening the feeble impulses. On the other hand, magnet 50 lies also in this undulating current, and thereby exercises a variable force on the armature 48 and on the diaphragm 32. The result is a second reaction, which also will strengthen the undulations of the local current, thus obtaining very marked and powerful undulations which can be utilized to reproduce the signals in any way that is desired, say by a Morse ink writer, or a telephone. If this arrangement is used as a transmitter, the coil 57 is replaced by a mouth piece, as has been stated previously, and the equilibrium of the steel spring 46 is disturbed either directly by the sound waves, or indirectly by a diaphragm which transmits its vibrations to the armature 47 by means of some mechanical connection, say an aluminium wire, or by some fluid. The effect thus obtained is the same as has just been explained. If apparatus of the kind shown in Figs. 2 to 5 are used, the operation is exactly the same, and need not be explained further.

Of course, parts of all the arrangements described may be interchanged, and other arrangements and modifications will appear to those skilled in the art, without departing from the scope of the invention.

I claim—

1. In an apparatus for relaying electrical currents, the combination of a microphone having a diaphragm embodied in a local circuit, an oscillating lever attached to said diaphragm, permanent magnets arranged to form a magnetic circuit, said lever forming part of said circuit, a line circuit coil adjustably mounted on one of said magnets and means for damping the oscillations of the lever.

2. In an apparatus for relaying electrical currents, the combination of a single contact microphone and a telephone both having one and the same diaphragm, the winding of the telephone and the microphone contacts being embodied in a local circuit, an oscillating lever attached to said diaphragm, permanent magnets arranged to form part of a magnetic circuit, another part of said circuit being formed by the oscillating lever, a line circuit coil adjustably mounted on the leg of one of said magnets and acting magnetically on the oscillating lever, and means for damping the oscillations of said lever.

3. In an apparatus for relaying electrical currents, the combination of a single contact microphone with a telephone, both having one and the same diaphragm, an oscillating lever attached thereto, an electromagnet for damping the oscillations of said lever, said electromagnet being included in a local circuit in series with the telephonic coil and the microphone, permanent magnets arranged to form part of a magnetic circuit, another part of said circuit being formed by the oscillating lever, a line circuit coil adjustably mounted on the leg of one of said magnets and acting magnetically on the oscillating lever, and means for damping the oscillations of said lever.

4. In an apparatus for relaying electrical currents, the combination of microphones with telephones, an oscillating lever attached to the diaphragms thereof, permanent magnets to form a magnetic circuit, said oscillating lever being one part of said circuit, an armature on said lever, magnets in magnetic connection with the aforesaid magnets to act upon said armature, one of said magnets being provided with a coil included in the circuit of the line currents and means to damp the oscillations of said oscillating lever.

5. In an apparatus for relaying electrical currents, the combination of microphones with telephones, with common diaphragms, an oscillating lever attached to the diaphragms, permanent magnets to form a magnetic circuit, said oscillating lever being one part of said magnetic circuit, armatures on said lever, one armature being attached at its free end, coils, the cores of which are in connection with said magnetic circuit, adapted to be traversed by the line currents and acting upon one of said armatures, and an electromagnet acting upon the end armature for damping the oscillations thereof, said electromagnet being included with the microphones and telephones in series in a local relay circuit.

6. In a telegraph and telephone system, a microphone system comprising a single pole telephone and a single contact microphone in series, a diaphragm common to both of them, a lever connected to the diaphragm, two polarized magnets at right angles to the lever, both traversed by line currents and both having adjustable cores.

7. In a telegraph and telephone system, a microphone system having two diaphragms, means for connecting them, a lever connected to said connecting means, and electromagnetic means controlled by current impulses for moving the lever.

8. In a telegraph and telephone system, a microphone system having two microphones, means for electrically connecting them, a diaphragm for each microphone, means for mechanically connecting the diaphragms, a lever connected to the connecting means and orthogonal electromagnetic means controlled by contact variations to move the lever in accordance with said variations.

9. In a telegraph and telephone system, a diaphragm, a lever for actuating the same, oppositely arranged electromagnets between which said lever vibrates and through which line pulsations pass, a third electromagnet below the lever traversed by local current and means to pivotally mount the assemblage.

In testimony whereof I have hereunto set my hand in presence of two subscribing witnesses.

Dr. JOSEF SCHIESSLER.

Witnesses:
AUGUST FUGGER,
ADA MARIA BERGER.